United States Patent [19]

Skoultchi

[11] Patent Number: 5,475,038
[45] Date of Patent: Dec. 12, 1995

[54] U.V. CURABLE LAMINATING ADHESIVE COMPOSITION

[75] Inventor: Martin M. Skoultchi, Somerset, N.J.

[73] Assignee: National Starch and Chemical Investment Holding Corporation, Wilmington, Del.

[21] Appl. No.: 241,230

[22] Filed: May 10, 1994

Related U.S. Application Data

[63] Continuation-in-part of Ser. No. 105,527, Aug. 11, 1993, abandoned.

[51] Int. Cl.⁶ ............................................. C08G 18/30
[52] U.S. Cl. .................... 522/96; 522/97; 525/455; 526/301; 528/49; 528/75; 156/275.5; 428/423.1; 428/424.8; 428/425.1
[58] Field of Search .................. 522/96, 97; 528/49, 528/75; 525/455; 526/301; 156/275.5; 428/403.1, 424.8, 425.1

[56] References Cited

U.S. PATENT DOCUMENTS

| | | | |
|---|---|---|---|
| 3,907,865 | 9/1975 | Miyata et al. | 260/471 C |
| 4,097,439 | 6/1978 | Darling | 526/302 |
| 4,129,667 | 12/1978 | Lorenz et al. | 427/44 |
| 4,135,007 | 1/1979 | Lorenz et al. | 427/44 |
| 4,309,526 | 1/1982 | Baccei | 528/75 |
| 4,608,409 | 8/1986 | Coady et al. | 522/96 |
| 4,672,001 | 6/1987 | Bravet et al. | 428/442 |
| 4,694,052 | 9/1987 | Hirose et al. | 522/96 |
| 4,786,586 | 11/1988 | Lee et al. | 430/532 |
| 4,789,625 | 12/1988 | Ellerstein et al. | 430/372 |
| 4,985,523 | 1/1991 | Mochezake et al. | 522/96 |
| 5,087,686 | 2/1992 | Ansell et al. | 528/49 |
| 5,093,386 | 3/1992 | Bishop et al. | 522/96 |
| 5,204,379 | 4/1993 | Kubota | 522/96 |

*Primary Examiner*—James J. Seidleck
*Assistant Examiner*—R. F. Johnson
*Attorney, Agent, or Firm*—Eugene Zagarella, Jr.

[57] ABSTRACT

A print laminating adhesive composition comprising a selected acrylate terminated photopolymerizable oligomer of the formula:

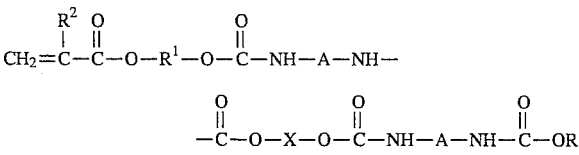

where A is the residue of a diisocyanate selected from the group consisting of diphenylmethane 4,4¹ diisocyanate and 4,4¹ dicyclohexylmethane diisocyanate; X is the residue of polypropylene glycol having a molecular weight of from about 150 to 4000; R is alkyl or hydroxyalkyl of 2 to 10 carbons; R¹ is alkylene of 2 to 3 carbons; and R² is hydrogen or methyl.

16 Claims, No Drawings

U.V. CURABLE LAMINATING ADHESIVE COMPOSITION

This application is a continuation-in-part of application Ser. No. 08/105,527 filed Aug. 11, 1993, abandoned.

BACKGROUND OF THE INVENTION

This invention relates to a radiation curable polyurethane oligomer composition useful as a print laminating adhesive.

The use of photopolymerizable acrylate terminated urethane oligomers have been disclosed in various applications. U.S. Pat. No. 5,087,686 issued Feb. 11, 1992 to C. Ansell, et al., describes curable polyurethane oligomers capped with acrylates and alcohols which are used in pressure sensitive adhesives. U.S. Pat. No. 4,786,586 issued Nov. 22, 1988 to S. Lee, et al. discloses acrylate terminated urethane oligomers having a polybutadiene or polybutene backbone and which are used as photoemulsion laminate layers in photographic film. U.S. Pat. No. 4,789,625 issued Dec. 6, 1988 to S. Ellerstein, et al., also discloses acrylate terminated urethane oligomers useful as photoemulsion laminates in photographic film wherein the backbone is derived from an alkanediol.

Other photopolymerizable acrylate terminated urethane compositions include polyurethane poly(meth)acrylates which contain tetramethylxylylenediisocyanate as the main polyisocyanate component in laminating film applications as disclosed in U.S. Pat. No. 5,204,379 issued Apr. 20, 1993 to T. Kabota, et al.; acryl urethane oligomers with a UV absorber as shown in U.S. Pat. Nos. 4,129,667 issued Dec. 12, 1978 and 4,135,007 issued Jan. 16, 1979 to D. Lorenz, et al.; and vinylurethane monomers disclosed in U.S. Pat. No. 3,907,865 issued Sep. 23, 1975 to N. Miyata, et al.

Despite the many known acrylate containing polyurethanes and other photopolymerizable compositions, there still is the need for a print laminating adhesive composition that can provide rapid curing and strong adhesion while having low volatility and odor, is not toxic and possesses other environment friendly characteristics.

SUMMARY OF THE INVENTION

This invention relates to a print laminating adhesive composition comprising a selected monoacrylate terminated photopolymerizable urethane and an acrylic monomer solvent mixture.

More particularly, the print laminating adhesive of this invention comprises:

A) an oligomer of the formula:

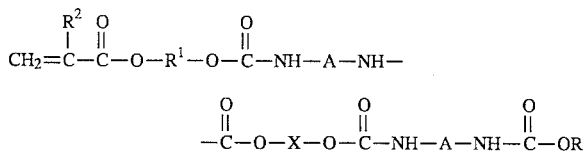

where A is the residue of a diisocyanate selected from the group consisting of diphenylmethane 4,4¹ diisocyanate and 4,4¹ dicyclohexylmethane diisocyanate; X is the residue of polypropylene glycol having a molecular weight of from about 150 to 4000; R is alkyl or hydroxyalkyl of 2 to 10 carbons; $R^1$ is alkylene of 2 to 3 carbons; and $R^2$ is hydrogen or methyl;

B) an acrylic monomer mixture comprising one or more monomers selected from the group consisting of
i) an alkyl, cycloalkyl, bicycloalkyl, heterocyclic or alkylene substituted heterocyclic acrylate or methacrylate having 4 to 12 carbon atoms in the alkyl or heterocyclic groups and wherein the hetero atom is oxygen;
ii) an alkoxylated phenol ether acrylate or methacrylate wherein the alkoxy group is ethoxy or propoxy; and
iii) acrylic or methacrylic acid; and C) a UV photoinitiator.

DETAILED DESCRIPTION OF THE INVENTION

The purpose of this invention is to provide a print laminating adhesive composition which can satisfy the required strong adhesive and curing properties and also have good environmental characteristics such as having low volatility, no odor and are not toxic.

The adhesive composition principally comprises a monoacrylate oligomer which is derived from the reaction product of selected diisocyanates and polypropylene glycol. The reaction product contains residual isocyanates which are capped or terminated with an acrylate and alcohol to yield a monofunctional acrylated oligomer. Use of the term acrylate as found throughout this application is intended to include the methacrylate counterpart with the acrylate being preferred.

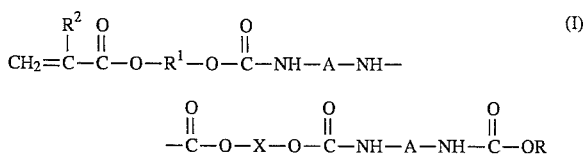

where A is the residue of a diisocyanate selected from the group consisting of diphenylmethane 4,4¹ diisocyanate and 4,4¹ dicyclohexylmethane diisocyanate; X is the residue of polypropylene glycol or mixtures of polypropylene glycol having a molecular weight of from abut 150 to 4000 and preferably about 400 to 2000; R is alkyl or hydroxyalkyl of 2 to 10 carbon atoms; $R^1$ is alkylene of 2 to 3 carbons; and $R^2$ is hydrogen or methyl. Use of the term polypropylene glycol as found herein in defining X is intended to cover polypropylene glycol as well as mixtures of polypropylene glycol having different molecular weight as described above.

The oligomer (I) is prepared by reacting sufficient diisocyanate and polyglycol to provide a prepolymer with isocyanate (–NCO) end groups. This can be attained by using an excess of isocyanate compound and more particularly two moles of isocyanate per mole of diol. The residual isocyanates are terminated by providing a sufficient quantity of acrylate to react with one of the terminal isocyanate groups and then capping the remaining group by reacting with alcohol to give an acrylated oligomer.

The acrylate used in preparing the oligomer (I), as noted above, will be a hydroxyalkyl acrylate or methacrylate where the alkyl group has 2 to 3 carbon atoms. The alcohol used will be any alcohol including diols and triols and more particularly will be an alkanol or dihydric or trihydric alcohol having 2 to 10 carbon atoms. Especially useful are the dihydric or trihydric alcohols.

The oligomer (I) is dissolved in a mixture of acrylic monomers and this may include all monomers which will polymerize with the oligomer and each other. More particularly, the acrylic monomer mixture will comprise one or more monomers selected from the group consisting of:

i) an alkyl, cycloalkyl, bicycloalkyl, heterocyclic or alkylene substituted heterocyclic acrylate or methacrylate having 4 to 12 carbon atoms in the alkyl or heterocyclic groups and wherein the hetero atom is oxygen;

ii) an alkoxylated phenol ether acrylate or methacrylate wherein the alkoxy group is ethoxy or propxy; and iii) acrylic and methacrylic acid. More particularly, the heterocyclic group will comprises a five or six membered ring with an oxygen hetero atom and the alkylene group will comprise one or two carbons. The alkoxylated phenol ether acrylate or methacrylate will have the formula:

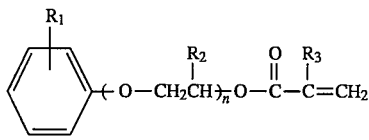

where $R_1$ is hydrogen or alkyl of 1 to 12 carbons, $R_2$ is hydrogen or methyl, $R_3$ is hydrogen or methyl and n is 1 to 12.

Examples of acrylic monomers of the types described above which are particularly useful are octyl acrylate, decyl acrylate, isobornyl acrylate, tetrahydrofurfuryl acrylate, ethoxylated phenol acrylate, ethoxylated alkylphenol acrylate and acrylic acid.

The acrylic monomer mixture used with the acrylated oligomer (I) may be used in varying amounts and generally from about 10 to 90% by weight of acrylic monomer mixture, based on the weight of the adhesive composition, will be used.

The adhesive composition of this invention containing oligomer (I) and acrylic monomer mixtures also contains a polymerization initiator sensitive to ultraviolet (UV) radiation. The UV radiation is generally that spectrum of wavelengths from about 460 nanometers down to about 180 nanometers and is usually obtained from the discharge of a mercury vapor or xenon lamp. The photoinitiators which may be used are usually those referred to as undergoing Norrish Type I or Norrish Type II reactions. The Type I compounds undergo alpha cleavage to form two free radicals, at least one of which is capable of initiating acrylic monomer polymerization. Compounds of this type include benzoin and its ethers (e.g., ethyl ether of benzoin), benzil ketals (e.g., benzil dimethyl ketal), alpha aminoacetophenones, chlorinated acetophenones, phosphine oxide derivatives (e.g., diphenyl 2,4,6-trimethylbenzoyl phosphine oxide), etc. The Type II compounds require a chain transfer agent capable of hydrogen transfer to an excited species. Representative of these materials are benzophenone, Michler's ketone, thioxanthone, benzimidizols, tertiary amines, various metallocenes, camphorquinone, etc. Initiator levels used will be an effective photoinitiating amount and more particularly from about 0.1 to 10% and preferably about 1 to 5% by weight, based on the weight of the composition.

In the process of providing laminating articles, the photocurable adhesive is coated onto a first substrate and then a second substrate bonded and laminated together to the first substrate using conventional means such as nip rolls. Ultraviolet rays are then applied to the layered substrates, usually over a period ranging from about 0.01 to 60 seconds, to photocure the adhesive and provide laminated articles with good adhesive strength and appearance. In providing the print laminated articles it is necessary that at least one of the substrates is transparent and allows the permeating of ultraviolet rays therethrough.

The adhesive composition of this invention is useful as a print laminating adhesive wherein one substrate comprising for example a printed sheet of paper is laminated to a synthetic resin film to provide a clear protective film or coating. Typical resins which may be used include polypropylene and polyethylene (treated or untreated), polyethylene terephthalate and polyvinylidine chloride.

The following examples will further illustrate the embodiments of this invention. In these examples all parts are given by weight and all temperatures in degrees Celsius unless otherwise noted.

EXAMPLE I

An acrylate urethane oligomer composition was prepared in the following manner. A flask was charged with 202.8 g of PPG 1025 (polypropylene glycol with average molecular weight of 1025), 83.2 g of PPG 425 (polypropylene glycol with average molecular weight of 425), 221.6 g of isobornyl acrylate, 150.0 g of diphenylmethane 4,4$^1$ diisocyanate and 0.4 g of dibutyltin dilaurate. The mixture was heated at 80° C. for two hours. Hydroxyethyl acrylate, 23.2 g, was added and the heating continued for one hour. Ethanol, 9.7 g, was added and heating continued until the isocyanate band in the IR at 2268 cm$^{-1}$ disappeared. The still warm product was diluted with 211.6 g of tetrahydrofurfuryl acrylate, 35.2 g acrylic acid and 35.2 g of Darocure 1173 initiator which is 2-hydroxy-2-methyl-1-phenyl-propane-1-one, a product of Ciba-Geigy. After thoroughly mixing, the mixture was poured warm into an opaque container. The yield of colorless product was 973 g with a viscosity of 8100 cP.

EXAMPLE II

The product prepared in Example I was diluted to different oligomer contents using a monomer mixture of 311 g of isobornyl acrylate, 300 g of tetrahydrofurfuryl acrylate, 49 g of acrylic acid and 24 g of Darocure 1173. Films using the different mixtures were cast using an applicator to yield a 0.5 mil thickness of uncured adhesive. The films were cast onto printed stock and covered with corona treated polypropylene. The composites were passed through the nip of twin-rollers and then exposed to a 300 watt/inch UV source on a conveyor belt running at various speeds. The strength of the adhesive bond was determined by using an Instron tester to measure the force necessary to separate the two adherents. Testing was also done by manually separating the films and observing the type of failure. Results are shown in the following table.

| % Oligomer | Viscosity (cP) | Cure Speed (ft/min) | Failure |
| --- | --- | --- | --- |
| 50 | 7120 | 50 | ink lift |
| 45 | 4680 | 60 | ink lift |
| 40 | 2850 | 70 | ink lift |
| 35 | 1850 | 75 | ink lift |
| 30 | 1020 | 85 | ink lift |
| 25 | 777 | 100 | ink lift |

Peel strengths as measured on the Instron ranged from 1.85 to 2.25 lb/in.

EXAMPLE III

An acrylate urethane oligomer composition was prepared as in Example I except that ethanol was replaced by 16.4 g of propylene glycol. A 50% oligomer solution having a viscosity of 7630 cP along with other diluted samples of different oligomer content as in Example II were used to produce laminated articles as described in that example. Evaluation of the products in the manner also shown in Example II gave similar results with Instron values not being determined as substrate failure occurred in all cases.

What is claimed is:

1. A laminating adhesive composition comprising:
   A) an oligomer of the formula:

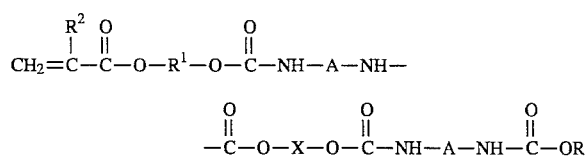

where A is the residue of a diisocyanate selected from the group consisting of diphenylmethane 4,4$^1$ diisocyanate and 4,4$^1$ dicyclohexylmethane diisocyanate; X is the residue of polypropylene glycol having a molecular weight of from about 150 to 4000; R is alkyl or hydroxyalkyl of 2 to 10 carbons; $R^1$ is alkylene of 2 to 3 carbons; and $R^2$ is hydrogen or methyl;

B) an acrylic monomer mixture comprising one or more monomers selected from the group consisting of:
      i) an alkyl, cycloalkyl, bicycloalkyl, heterocyclic or alkylene substituted heterocyclic acrylate or methacrylate having 4 to 12 carbon atoms in the alkyl or heterocyclic groups and wherein the hetero atom is oxygen;
      ii) an alkoxylated phenol ether acrylate or methacrylate wherein the alkoxy group is ethoxy or propoxy; and
      iii) acrylic or methacrylic acid; and
   C) a UV photoinitiator.

2. The adhesive composition of claim 1 wherein from about 10 to 90% by weight of the acrylic monomer mixture and 0.1 to 10% by weight of the photoinitiator, based on the weight of the composition, are used.

3. The adhesive composition of claim 2 wherein A is the residue of diphenylmethane 4,4$^1$ diisocyanate and X is the residue of polypropylene glycol having a molecular weight of about 400 to 2000.

4. The adhesive composition of claim 1 wherein $R^2$ is hydrogen.

5. The adhesive composition of claim 4 wherein from about 10 to 90% by weight of the acrylic monomer mixture and 0.1 to 10% by weight of the photoinitiator, based on the weight of the composition, are used.

6. The adhesive composition of claim 5 wherein A is the residue of diphenylmethane 4,4' diisocyanate and X is the residue of polypropylene glycol having a molecular weight of from about 400 to 2000.

7. The adhesive composition of claim 6 wherein R is hydroxyalkyl of 2 to 10 carbons.

8. The adhesive composition of claim 6 wherein the acrylic monomer mixture comprises at least one of octyl acrylate, decyl acrylate, isobornyl acrylate, tetrahydrofurfuryl acrylate, ethoxylated phenol acrylate or acrylic acid.

9. The adhesive composition of claim 6 wherein the acrylic monomer mixture comprises isobornyl acrylate, tetrahydrofurfuryl acrylate and acrylic acid.

10. The method of forming a print laminated product comprising applying to one substrate comprising a printed sheet of paper, the laminating adhesive composition of claim 1, applying a second substrate to the adhesive coated first substrate, and then applying UV radiation to cure the formed laminated product.

11. The method of claim 10 wherein said second substrate comprises a transparent synthetic resin film.

12. The method of claim 11 wherein in the adhesive composition A is the residue of diphenylmethane 4,4$^1$ diisocyanate, X is the residue of polypropylene glycol having a molecular weight of about 400 to 2000 and $R^2$ is hydrogen.

13. The method of claim 12 wherein the synthetic resin film is polypropylene.

14. A print laminated article comprising a printed sheet of paper having a synthetic resin film substrate laminated thereon wherein the two substrates are laminated using the laminating adhesive composition of claim 1.

15. A print laminated article comprising a printed sheet of paper having a synthetic resin film substrate laminated thereon wherein the two substrates are laminated using the laminating adhesive composition of claim 8.

16. The print laminated article of claim 15 wherein the synthetic resin film is polypropylene.

* * * * *